March 5, 1935. J. L. DRAKE 1,992,997
PROCESS AND APPARATUS FOR PRODUCING LAMINATED SHEET GLASS
Filed Aug. 14, 1930
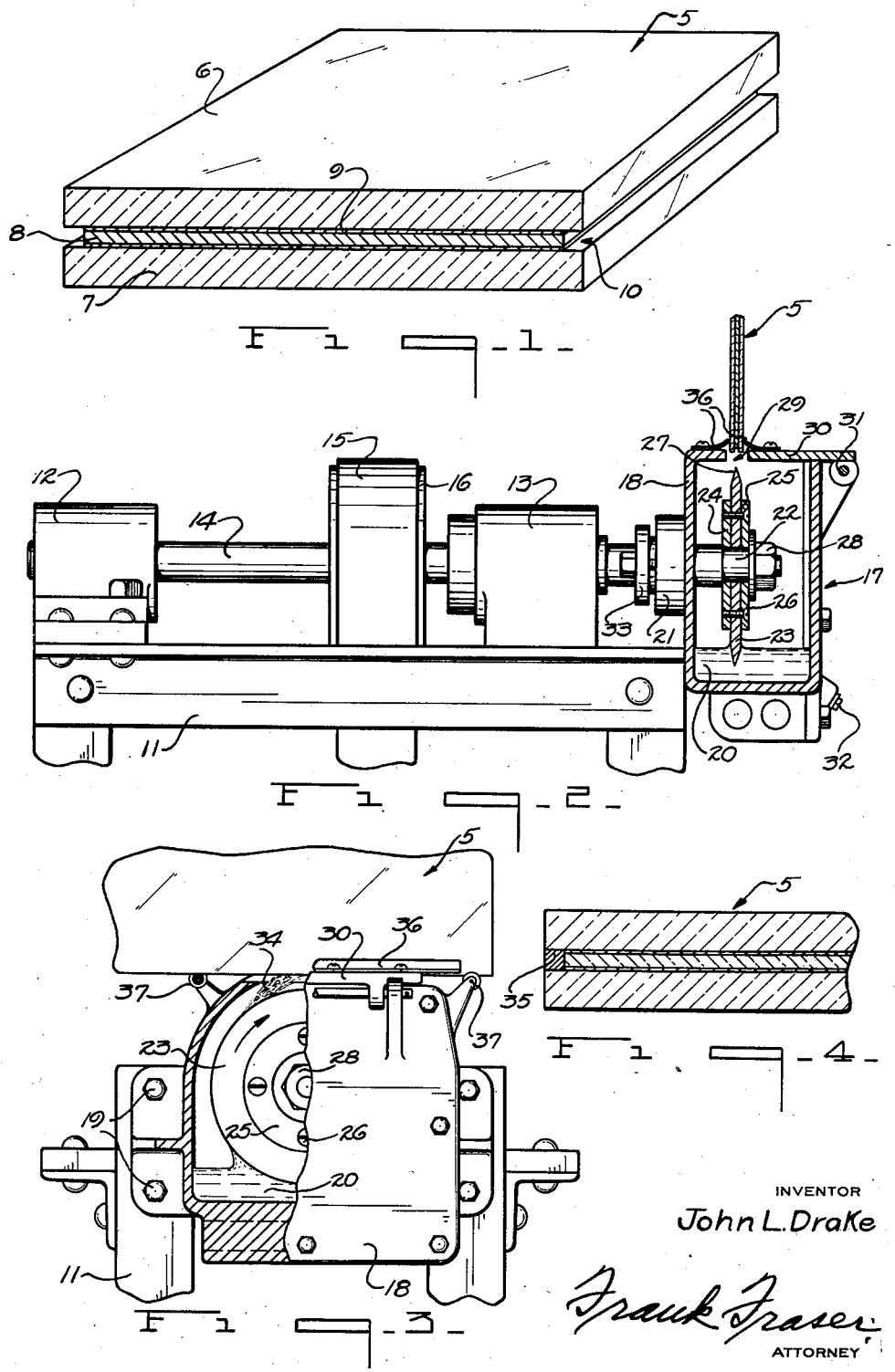
INVENTOR
John L. Drake
Frank Fraser
ATTORNEY Patented Mar. 5, 1935

1,992,997

UNITED STATES PATENT OFFICE 1,992,997

PROCESS AND APPARATUS FOR PRODUCING LAMINATED SHEET GLASS

John L. Drake, Toledo, Ohio, assignor to Libbey-Owens-Ford Glass Company, Toledo, Ohio, a corporation of Ohio Application August 14, 1930, Serial No. 475,217

11 Claims. (Cl. 49—81)

This invention relates to the manufacture of laminated sheet glass and particularly to an improved process and apparatus for sealing or luting the edges thereof.

Laminated glass is ordinarily produced by uniting two or more sheets of glass and one or more sheets of a suitable non-brittle material to form a composite sheet, one sheet of non-brittle material being usually interposed between and bonded to two sheets of glass. When the proper materials are used and an adequate bond obtained between the several sheets or laminations, laminated glass is desirable for the reason that it is practically non-shatterable or non-scatterable. In order to protect the non-brittle sheet and the bond between the several laminations from disturbing atmospheric conditions, the practice of sealing or luting the edges of the laminated sheet is sometimes followed. This sealing is accomplished by first providing a continuous channel or groove around the edges of the laminated sheet between the adjacent sheets of glass and in then filling in this channel or groove with a suitable sealing material. The formation of the groove is preferably accomplished by cutting out or removing a portion of the non-brittle material from around the edges of the laminated sheet to give the desired space for sealing.

The general object of the present invention is the provision of a novel and improved process and apparatus whereby the sealing or luting of the edges of laminated sheets of glass may be rapidly and conveniently effected in a thorough and efficient manner.

Another object of the invention is the provision of such a process and apparatus wherein the sealing material is first set in motion and then forced into the groove or channel in the laminated sheet by utilizing the kinetic energy of the sealing material due to its motion.

Another object of the invention is the provision of such a process and apparatus wherein the sealing material is fed into the groove or channel in the laminated sheet by centrifugal force.

A further object of the invention is the provision of such a process and apparatus wherein the centrifugal force for feeding the sealing material into place is preferably created incident to the rotation of a disc-like element immersed within the sealing material and positioned in substantial alignment with respect to the sheet edge to be sealed but spaced therefrom.

Other objects and advantages of the invention will become more apparent during the course of the following description when taken in connection with the accompanying drawing.

In the drawing forming a part of this application and wherein like numerals are employed to designate like parts throughout the same.

Fig. 1 is a perspective sectional view of a sheet of laminated glass prior to the sealing thereof.

Fig. 2 is a side elevation, partially in section, of an improved sealing machine provided by the present invention, Fig. 3 is an end elevation of the sealing machine, partially broken away, and Fig. 4 is a fragmentary sectional view showing the laminated sheet after being sealed.

In Fig. 1 of the drawing, there is illustrated a sheet of laminated or composite glass 5 composed of two sheets of preferably transparent glass 6 and 7 between which is interposed a sheet or membrane 8 of some suitable non-brittle material joined or bonded to the glass sheets by any suitable solvent, adhesive or the like 9 whereby to create a unitary structure. The surfaces of the glass sheets may or may not be ground and polished, as desired, and it is to be understood that the present invention is not restricted to any particular type of laminated glass, the materials used in its structure, or the process of laminating.

As shown in Fig. 1, a continuous channel or groove 10 is provided around the edges of the laminated sheet between the two sheets of glass and it is into this channel or groove that the seal is adapted to be placed so as to protect the non-brittle lamination 8 and the bonding medium 9 from the atmosphere. This channel or groove may be formed by uniting the glass sheets with a slightly smaller sheet of non-brittle material, or the sheet of non-brittle material may be initially as large as the glass sheets and then subsequently cut back from the edges of the glass sheets to form the groove or channel.

In Figs. 2 and 3 is shown an improved sealing machine constructed in accordance with the present invention for carrying out the present process. This sealing machine includes a horizontal supporting bed or frame 11 upon which are mounted, adjacent its opposite ends, the horizontally spaced bearings 12 and 13 within which is journaled a horizontal shaft 14 driven in any desired manner such as by means of a belt 15 trained about the drum or pulley 16 fixed to said shaft.

The sealing unit per se is designated in its entirely at 17 and comprises a housing or receptacle 18 preferably removably secured to the supporting frame 11 at one end thereof by means of bolts or the like 19, said receptacle containing a suitable sealing material 20. The housing 18 is also provided with a bearing portion 21 within which shaft 14 is also journaled, said shaft projecting into the housing and being reduced in diameter at its outer end as at 22. Fixed to the reduced end portion 22 of shaft 14 is the sealing element or tool comprising a disc 23 which is slipped over the reduced end of the shaft and is clamped between two circular plates 24 and 25 by means of fastening elements 26, said disc tapering to an edge 27 at its periphery. The disc 23 and plates 24 and 25 are secured upon shaft 14 by a nut 28.

As shown, the rotatable sealing element 23 is adapted to have the lower portion of its periphery immersed within the sealing liquid 20, while the upper portion of its periphery terminates directly beneath a slot 29 formed in the top or cover plate 30 of the housing, which top may be hinged as at 31 so that it can be thrown back when it is desired to replenish the supply of sealing liquid within the housing. A drain plug 32 may also be provided to allow for the draining out of the sealing liquid, when desired, and a packing gland 33 surrounds shaft 14 within bearing portion 21 to prevent the sealing liquid from seeping out past said bearing.

In carrying out the present invention, a desired amount of sealing liquid 20 is first placed within the housing 18 and this liquid is not adapted to entirely fill the housing but, on the other hand, the amount used must be sufficient so that the lower portion of the periphery of the sealing element 23 will be immersed therein. The laminated sheet 5 is then held in a vertical position above the slot 29 in the top of housing 18, being supported upon rollers or the like 37 carried by housing 18, with the edge to be sealed at the bottom thereof or, otherwise stated, facing downwardly. The shaft 14 is then driven to cause rotation of the sealing element in the direction indicated by the arrow in Fig. 3 and simultaneously, the sheet is moved horizontally, preferably in a direction opposite to the direction of rotation of disc 23. As the sheet is moved along over the rotating disc and in spaced relation thereto, the said disc rotating at a relatively high speed will function to pick up the sealing material and, by centrifugal force, feed or throw the sealing material into the groove 10 to be sealed so that the said groove or channel will be completely filled to form a seal as indicated at 35 in Fig. 4. It will be noted that the sheet to be sealed is in substantial vertical alignment with the disc 23 but is spaced there above, since the upper portion of said disc terminates beneath the slot 29. In order to prevent flying or scattering of the sealing material, strips of rubber or the like 36 can be carried by the top 30 of housing 18 to engage opposite faces of the sheet.

While the sealing material has been described hereinabove as being fed into the channel or groove in the edge of the laminated sheet by centrifugal force incident to the rotation of disc 23, yet it is to be understood that, in its broadest aspect, the present invention contemplates the practice of any process wherein the sealing material is first set in motion and then forced into place in the sheet edge by utilizing the kinetic energy of the sealing material due to its motion.

It is also to be understood that the form of the invention herewith shown and described is to be taken as the preferred embodiment of the same, and that various changes in the shape, size and arrangement of parts may be resorted to without departing from the spirit of the invention or the scope of the subjoined claims.

I claim:
1. The process of sealing laminated sheet glass, wherein the edges of the sheet to be sealed are each provided with a channel or groove for the reception of a sealing material, which consists in feeding all of the sealing material into place in said channel or groove by centrifugal force.

2. The process of sealing laminated sheet glass, wherein the edges of the sheet to be sealed are each provided with a channel or groove for the reception of a sealing material, which consists in feeding the sealing material into place in said channel or groove by centrifugal force created incident to the rotation of a disc-like element positioned in substantial alignment with the sheet edge but spaced therefrom.

3. The process of sealing laminated sheet glass, wherein the edges of the sheet to be sealed are each provided with a channel or groove for the reception of a sealing material, which consists in first positioning the sheet with the edge to be sealed facing downwardly, passing the sheet in a generally horizontal direction, and feeding all of the sealing material up into place in said channel or groove by centrifugal force.

4. The process of sealing laminated sheet glass, wherein the edges of the sheet to be sealed are each provided with a channel or groove for the reception of a sealing material, which consists in first positioning the sheet with the edge to be sealed facing downwardly, passing the sheet in a generously horizontal direction, and feeding the sealing material up into place in said channel or groove by centrifugal force created incident to the rotation of a disc-like element positioned in substantial vertical alignment with the sheet edge but spaced therefrom.

5. The process of sealing laminated sheet glass, wherein the edges of the sheet to be sealed are each provided with a channel or groove for the reception of a sealing material, which consists in positioning the laminated sheet in relation to a sealing element in such manner that said sealing element is spaced from the groove or channel but in substantial alignment therewith, in moving the sheet relative to said element, and in simultaneously rotating said element to feed the sealing material into the groove or channel by centrifugal force.

6. The process of sealing laminated sheet glass, wherein the edges of the sheet to be sealed are each provided with a channel or groove for the reception of a sealing material, which consists in positioning the laminated sheet above a sealing element in such a manner that the sealing element is spaced from the groove or channel but in substantial alignment therewith, in moving the sheet substantially horizontally with respect to said element, and in simultaneously rotating said element to feed the sealing material upwardly into the groove or channel by centrifugal force.

7. Apparatus for sealing laminated sheet glass, wherein the sheet is provided with a channel or groove at the edge thereof to be sealed, including sealing means rotatable about a substantially fixed axis in spaced relation to the sheet, means for supplying a sealing material to said sealing means, and means for driving said sealing means to cause the sealing material to be forced into the channel or groove by centrifugal force.

8. Apparatus for sealing laminated sheet glass, wherein the sheet is provided with a channel or groove at the edge thereof to be sealed, including a disc-like element rotatable about a substantially horizontal axis in spaced relation to the sheet, means for supplying a sealing material to said disc-like element, and means for driving said disc-like element to cause the sealing material to be forced into the channel or groove by centrifugal force.

9. Apparatus for sealing laminated sheet glass, wherein the sheet is provided with a channel or groove at the edge thereof to be sealed, including a housing adapted to contain a sealing liquid, a disc-like sealing element positioned within the housing and rotatable about a substantially horizontal axis, the lower portion of said element being immersed within the sealing liquid and the upper portion thereof terminating beneath the top of said housing, and means for driving said sealing element to cause the sealing liquid to be fed into the channel or groove by centrifugal force.

10. Apparatus for sealing laminated sheet glass, wherein the sheet is provided with a channel or groove at the edge thereof to be sealed, including a receptacle adapted to contain a sealing liquid and having a top provided with a slot, and a disc-like sealing element positioned within the receptacle and rotatable about a substantially horizontal axis, the sealing element being positioned in alignment with said slot but terminating therebeneath and the lower portion thereof being immersed within the sealing fluid.

11. Apparatus for sealing laminated sheet glass, wherein the sheet is provided with a channel or groove at the edge thereof to be sealed, including a receptacle adapted to contain a sealing liquid and having a top provided with a slot, and a disc-like sealing element positioned within the receptacle and rotatable about a substantially horizontal axis, the sealing element being positioned in alignment with said slot, and means for supporting the laminated sheet in a vertical position above said slot and in spaced relation to said disc-like element.

JOHN L. DRAKE.